United States Patent [19]
Pearl

[11] 4,088,622
[45] May 9, 1978

[54] MOLDED DRAG REDUCTION COATINGS

[75] Inventor: Harry A. Pearl, Middletown, R.I.

[73] Assignee: The United States of America as represented by the Secretary of the Navy, Washington, D.C.

[21] Appl. No.: 699,923

[22] Filed: Jun. 25, 1976

[51] Int. Cl.² .............................................. C08K 5/07
[52] U.S. Cl. ............................ 260/32.8 R; 114/67 R; 260/33.2 R; 260/45.95 C; 260/823; 264/112; 264/171
[58] Field of Search ............. 106/38.22; 260/45.95 C, 260/18 R, 823, 32.8 R, 33.2 R; 114/67 R, 20; 137/13; 264/112, 171

[56] References Cited

U.S. PATENT DOCUMENTS

| | | | |
|---|---|---|---|
| 3,158,581 | 11/1964 | Vandenberg | 260/45.95 C |
| 3,530,069 | 9/1970 | O'Neill | 260/45.95 C |
| 3,843,589 | 10/1974 | Wartman | 137/13 |

*Primary Examiner*—Lorenzo B. Hayes
*Attorney, Agent, or Firm*—Richard S. Sciascia; Arthur A. McGill; Prithvi C. Lall

[57] ABSTRACT

Improved molded drag reduction coatings which inhibit the degradation of drag reduction properties of high molecular weight polymers such as polyethylene oxide. The moldings incorporate compatible anti-oxidants and/or lubricants and plasticizers in amounts that do not significantly decrease the drag reduction effectiveness of the polymer used.

6 Claims, 4 Drawing Figures

MOLDED DRAG REDUCTION COATINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to drag reduction materials and the method of making such materials and more particularly to a method of making improved molded drag reduction coating formulations which inhibit the degradaton of drag reduction properties of high molecular weight polymers such as polyethylene oxide.

The present drag reduction systems usually uses the proccess of injecting the drag reduction slurries or solutions into the boundary layer. This requires equipment for storage, dissolving pumping and ejecting metered quantities of a drag reduction material into and not past the boundary layer of a moving vehicle such as a torpedo traveling at various speeds and depths. The use of aforementioned mixing and ejection equipment inherently generates undesirable noise and requires perforation of the surface of the vehicle. On the other hand, the use of coatings for drag reduction is a one shot process that can be easily applied directly to the pertinent hardware such as a torpedo. However, the use of heat and pressure treatments used to mold the powder of high molecular weight polymers into coatings deteriorates appreciably the drag reduction and noise reduction properties of the polymers. Consequently, it is desirable to use molded coatings for drag reduction which eliminates the inherent noise generated by the mixing and ejection equipment and to prevent the deterioration of the drag reduction capabilities during the heat and pressure treatment of high polymer powders used in the process of molding such coatings.

SUMMARY OF THE INVENTION

The method of making improved molded drag reduction coatings includes incorporation of compatible anti-oxidants and/or lubricants and plasticizers (internal and/or external) and wetting agents in amounts that do not significantly decrease the drag reduction and effectiveness of a high molecular weight polymer such as polyethylene oxide. The anti-oxidants used are either chain terminators and/or peroxide decomposers. The ingredients are mixed well with the powder of a high molecular weight polymer and the mixture is used to form a molded coating. Alternatively, a compression mold is used for treatment at preset temperature and pressure conditions and the mixture is allowed to cool while under pressure in order to obtain the improved molded drag reduction coating. Other high temperature, pressure molding techniques can also be used for making a coating.

The coatings can be molded directly to the selected areas of the vehicle; preformed and bonded to complex curvatures; made into flat flexible sheets or pretailored sections that are bonded to flat, simple or complex curved areas of a vehicle.

An object of this invention is a method of making high molecular weight polymers into coatings which can be used for drag and noise reduction of a moving vehicle in water.

Another object of this invention is to use a wide range of compatible simple or multiple additives for molding high molecular weight polymers into coatings without any appreciable degradation of the drag reduction properties of the polymers.

Still another object of this invention is to make molded coatings having high molecular weight polyethylene oxide polymers than has been hereto possible.

Other objects, advantages and novel features of the invention will become apparent from the following detailed description of the invention when considered in conjunction with the accompanying drawings wherein:

THE DESCRIPTION OF THE DRAWINGS

DESCRIPTION OF PREFERRED EMBODIMENTS

Figure 3:
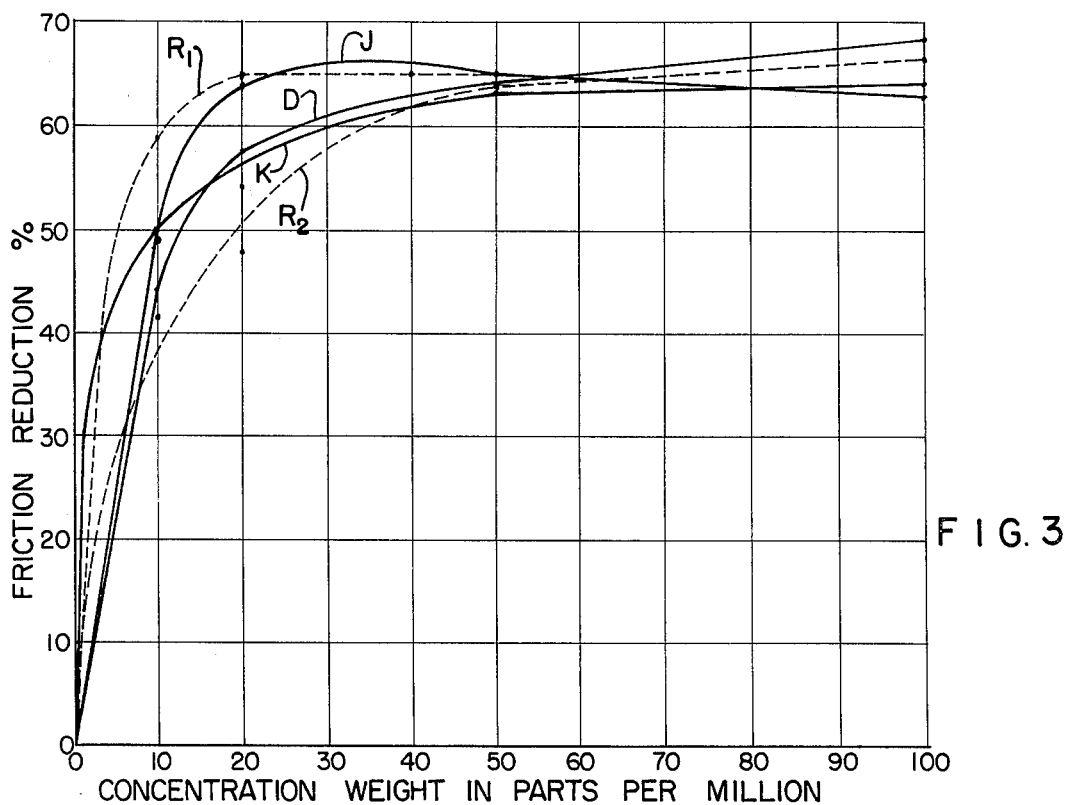
FIG. 3 is a graphical representation of the drag reduction variation of the moldings made according to the teachings of subject invention at various aqueous solution concentrations of the polymer used.
Figure 4:
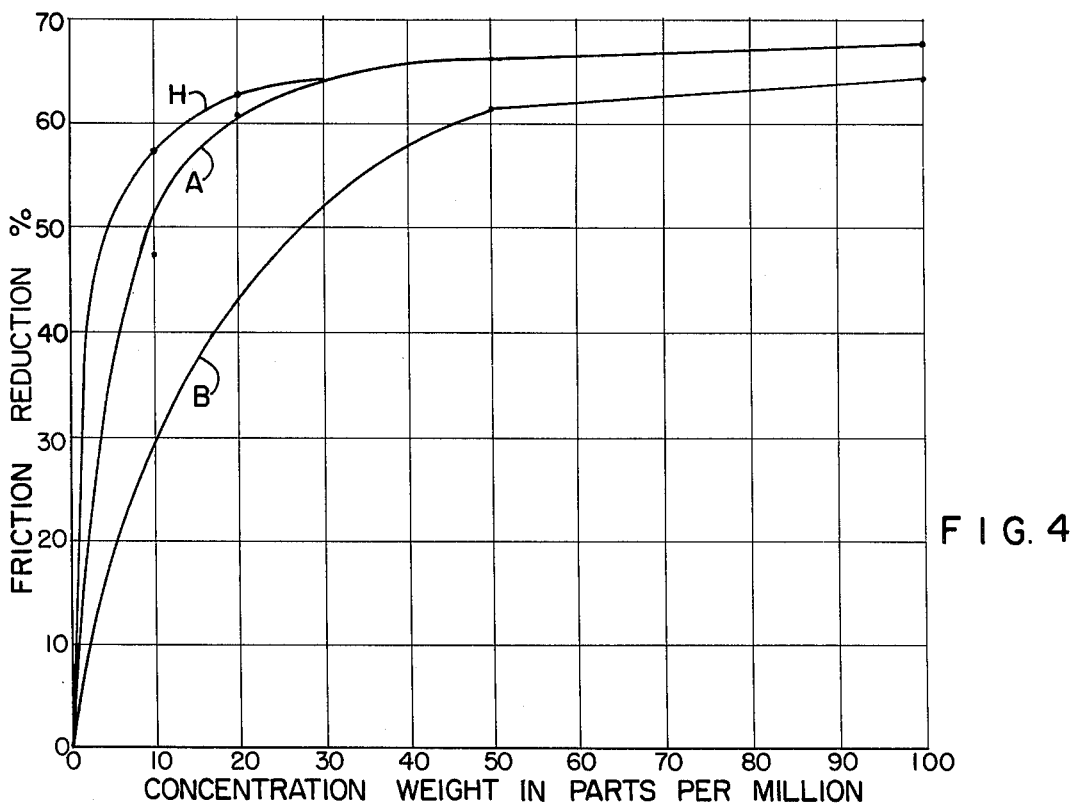
FIG. 4 is also a graphical representation of the variation of the drag reduction capabilities of the improved moldings using three more representative samples thereof.

Referring to the drawings, FIGS. 3 and 4 show graphical representations of the effectiveness of the drag reduction capability of the improved mold as a function of concentration of the additives in the high molecular weight polyethylene oxide powder before molding. FIG. 3 compares the drag reduction effectiveness of aqueous solutions polyethylene oxide polymers of molecular weights $4 \times 10^6$ and $9 \times 10^5$ in powder form represented by curves $R_1$ and $R_2$ respectively with the heat and pressure treated moldings containing mostly the polyethylene oxide polymer of molecular weight $4 \times 10^6$ and some plasticizers and/or anti-oxidants represented by curves D, J and K. As can be seen from FIG. 3, the high molecular weight $4 \times 10^6$ polymer is quite effective at very low concentrations e.g. 60% friction for 10 parts by weight of the polymer in one million parts of water. FIG. 3 further illustrates that the heat and pressure treatment in the process of making moldings of polyethylene oxide of molecular weight $4 \times 10^6$ does not appreciably degrade the effectiveness of the drag reduction capability of the polymer. The drag reduction effectiveness is compared at various aqueous solution concentrations of the polymers in powder forms compared with the same concentrations of the moldings. FIG. 4 further illustrates the same point by using three additional coatings which will be presently described.

Figure 1:
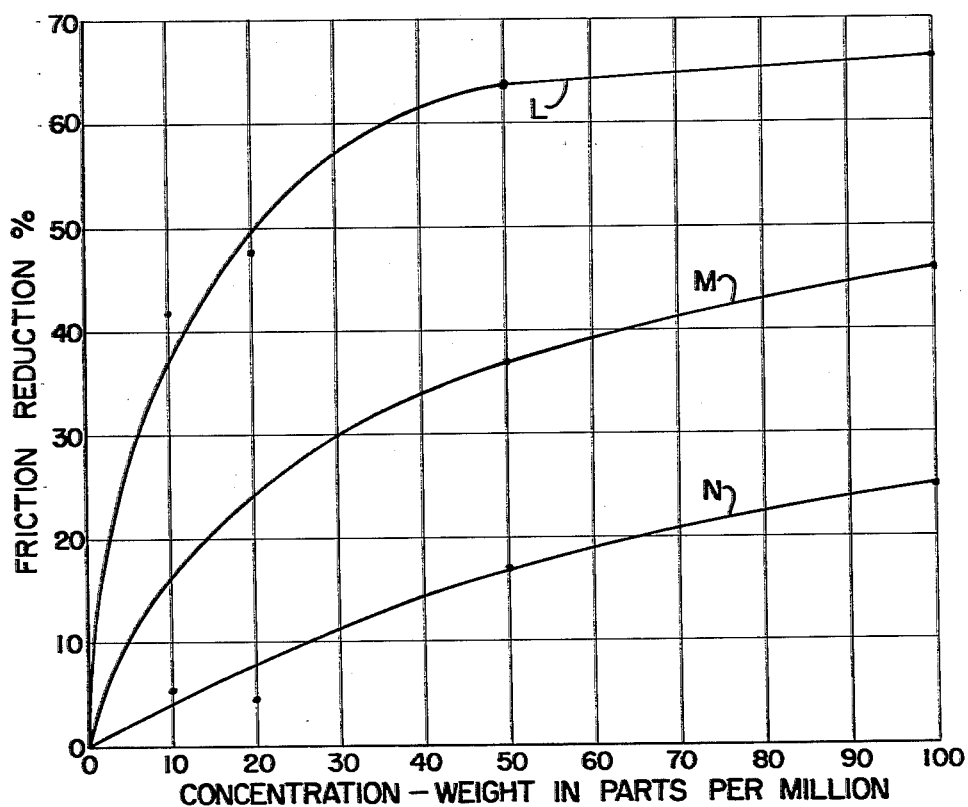
FIG. 1 is a graphical representation of the variation of drag reduction effectiveness of a high molecular weight polymer in powder, calendered and laminated forms in aqueous solutions at different concentrations thereof.
Figure 2:
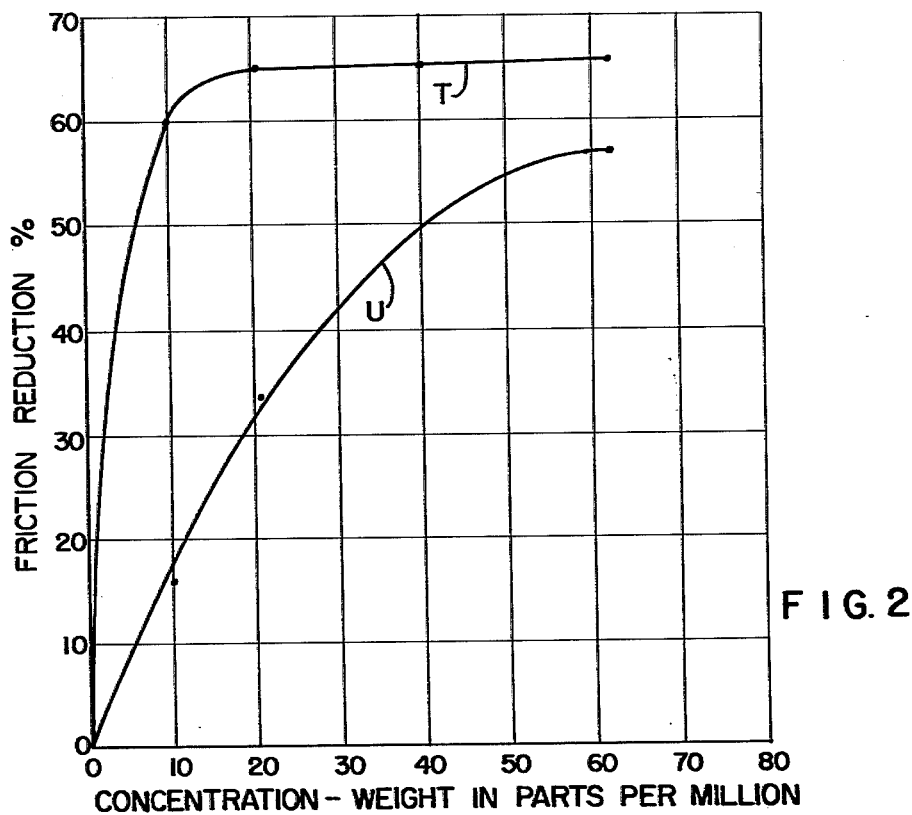
FIG. 2 is a graphical representation of the variation of the drag reduction effectiveness of a high molecular weight polymer in powder and molded forms in aqueous solutions at different concentrations thereof.

FIG. 1 illustrates the degradation in the drag reduction properties of polyethylene oxide polymer of molecular weight $9 \times 10^5$ when it is calendered under the conditions of high temperature, pressure and tension to form a continuous film approximately 1.7 mils (1 mil - $10^{-3}$ inch) thick. FIG. 1 also illustrates further degradation of the drag reduction properties of the coating or film when a number of sheets of the film are laminated and molded using a very mild molding temperature (150° F) and a pressure of 500 psi (per square inch). Curve L of FIG. 1 represents the effect of concentration (parts by weight in one million parts of water) of polyethylene oxide of molecular weight $9 \times 10^5$ when used in powder form without any processing to form a film or coating. Curves M and N of FIG. 1 illustrates the variation of effectiveness in drag reduction as a function of concentration of the polyethylene oxide polymer of molecular weight $9 \times 10^5$, Curve M illustrating the deterioration in drag reduction when the polymer powder is calendered into 1.7 mils film and Curve N illustrating further degradaton when 16 sheets, each of thickness 1.7 mils, are attached and molded together under mild conditions. FIG. 1 thus shows that most of the effectiveness of the high molecular weight polyethylene oxide polymer is attained at very low concentrations (i.e. less than 20 parts by weight in 1 million parts by weight of water - hereafter designated as 20 parts per million). Furthermore, it shows that there is appreciable degradation of its drag reduction properties if the polymer powder is calendered and/or treated under various temperature and pressure conditions. FIG. 2 illustrates a large degradation in the drag reduction properties of polyethylene oxide polymer of molecular weight $4 \times 10^6$ due to mild molding temperature and pressure conditions. Curve T of FIG. 2 represents the variation in the drag reduction properties of the aqueous solutions of the polymer in powder form whereas Curve U shows the degradation in its drag reduction properties when the polymer powder is processed under mild temperature (300° F) and pressure (415 psi) conditions. FIGS. 1 and 2 combined thus illustrate the problem in the prior art which subject invention addresses itself to. As pointed out earlier, FIGS. 3 and 4 show clearly the effect of various additives to the polymer powder to be introduced before molding the mixture to form a coating by use of various temperature and pressure conditions. This is illustrated by using six different coatings which are:

a. Coating 1 (represented by curve K of FIG. 3)

100 parts by weight of $4 \times 10^6$ molecular weight polyethylene oxide polymer powder
0.5 parts by weight of 4, 4' thio-bis (6 tert-butyle meta cresol) in 20 c.c. acetone Mix the ingredients well. Distribute the mixture evenly into the mold cell and treat the mold cell at a temperature of 300° F and pressure of 415 psi. Cool the mold while under pressure.

b. Coating 2 (represented by curve A of FIG. 4)

87 weight percent of $4 \times 10^6$ molecular weight polyethylene oxide polymer powder
13 weight percent of $9 \times 10^5$ molecular weight polyethylene oxide polymer calendered into approximately 1.7 mil thick film.

Place one layer of the calendered film at the bottom of the mold cell. Add and distribute the polymer powder evenly on top of the film. Mold at 230° F and 500 psi. Cool while under pressure.

c. Coating 3 (represented by curve H of FIG. 4)

91 weight percent $4 \times 10^6$ molecular weight polyethylene oxide polymer powder
9 weight percent of a 4.8% by weight solution of 4, 4' thio bis (6 tert-butyl meta cresol) in polyoxyalkylene sorbitan monoluaurate of theoretical molecular weight of 1226

Mix the ingredients until uniform. Distribute the mixture evenly into the mold cell. Compression mold at 180° F and 415 psi. Cool while under pressure.

d. Coating 4 (represented by curve B of FIG. 4)

91 weight percent $4 \times 10^6$ molecular weight polyethylene oxide polymer powder
9 weight percent of a 4.8% by weight solution of 4, 4' thio bis (6 tert-butyl meta cresol) in polyoxyalkylene sorbitan monolaurate of theoretical molecular weight 1226

Mix ingredients until uniform. Distribute the mixture evenly into the mold cell. Compression mold at 240° F and 500 psi. Cool while under pressure.

e. Coating 5 (represented by curve J of FIG. 3)

91 weight percent $4 \times 10^6$ molecular weight polyethylene oxide polymer powder
4.5 weight percent of a 4.8% by weight solution of 4, 4' thio bis (6 tert-butyl meta cresol) in polyoxyalkylene sorbitan monolaurate of theoretical molecular weight 1226
4.5 weight percent anisole (methyl phenyl ether)

Mix ingredients until uniform. Distribute the mixture evenly into the mold cell. Compression mold at 300° F and 451 psi. Cool while under pressure f. Coating 6 (represented by curve D of FIG. 3)

80 weight percent $4 \times 10^6$ molecular weight polyethylene oxide polymer powder
4 weight percent of 4.8% by weight solution of 4, 4' thio bis (6 tert-butyl meta cresol) in polyoxalkylene sorbitan monolaurate of theoretical molecular weight 1226
4 weight percent anisole (methyl phenyl ether)
12 weight percent of $9 \times 10^5$ molecular weight polyethylene oxide polymer calendered into approximately 1.7 mil thick film Mix the first three ingredients until uniform. Place one layer of the calendered film at the bottom of the mold cell. Add and distribute the previously prepared mixture evenly on top of the film. Cover the mixture with another piece of film. Compression mold at 230° F and 500 psi. Cool while under pressure.

Thus improved molded drag reduction coating formulations of subject invention use a high molecular weight polymer such as polyethylene oxide mixed with a compatible plasticizer and/or compatible anti-oxidants. The presence of these additives substantially preserve the drag reducing properties of high molecular weight polymer used when the mixture thereof with additives is treated to make a coating under different conditions of temperature and pressure for a preselected time.

Obviously many modifications and variations of the present invention are possible in the light of above teachings. It should be clearly understood that the above-mentioned examples have been cited purely by way of examples and not by way of limitations, particularly as to the choice of the high molecular weight drag reducing polymer and the additives used as plasticizers (temporary and permanent), anti-oxidants (chain terminators and peroxide decomposser) and lubricants and wetting agents. Furthermore, the methods of molding the mixture of the polymers and the additives under various temperature and pressure conditions can also be varied without deviating from the teachings of subject invention.

It is therefore understood that within the scope of the appended claims the invention may be practiced otherwise than as specifically described.

I claim:

1. An improved molded drag reduction coating comprising:
    100 parts by weight of polyethylene oxide polymer in powder form having a molecular weight of $4 \times 10^6$ molded together with 0.5 parts by weight of 4, 4' thio-bis (6-tert-butyl meta cresol) in 20 c.c. of acetone at a temperature of 300° F and a pressure of 415 psi.

2. An improved molded drag reduction coating comprising:
    87 percent by weight of a powder of a first polyethylene oxide polymer having a molecular weight of $4 \times 10^6$ molded together with 13 percent by weight of a second polyethylene oxide polymer of molecular weight $9 \times 10^5$ in a calendered film form of thickness 1.7 mils at 230° F and 500 psi.

3. An improved molded drag reduction coating comprising:
    91 weight percent of polyethylene oxide polymer powder having a molecular weight of $4 \times 10^6$ molded together with 9 weight percent of a 4.8 percent by weight solution of 4, 4' -thio-bis (6-tert-butyl meta cresol) in polyoxyalkylene sorbitan monolaurate of theoretical weight of 1226 at 180° F and 415 psi.

4. An improved molded drag reduction coating comprising:
    91 percent by weight of polyethylene oxide polymer powder having a molecular of $4 \times 10^6$ molded together with 4.5 percent by weight of a 4.8 percent by weight solution of 4, 4' thio-bis (6-tert-butyl meta cresol) in polyoxyalkylene sorbitan monolaurate of theoretical weight 1226; and
    4.5 percent by weight of anisole (methyl phenyl ether) at temperature and pressure conditions of 300° F and 451 psi respectively.

5. An improved molded drag reduction coating comprising:
    80 weight percent of the first polyethylene oxide polymer powder having a molecular weight of $4 \times 10^6$;
    4 percent of a 4.8 percent by weight solution of 4, 4' thio-bis (6-tert-butyl meta cresol) in polyoxyalkylene sorbitan monolaurate of theoretical weight 1226;
    4 weight percent of anisole (methyl phenyl ether); and
    12 weight percent of the second polyethylene oxide polymer of molecualr weight $9 \times 10^5$ and calendered into a film at temperature and pressure conditions of 230° F and 500 psi respectively.

6. A method of making an improved drag reduction coating including the steps of:
    mixing uniformly a powder of a first polyethylene oxide polymer of molecualr weight $4 \times 10^6$ with 4.8 percent of weight solution of 4, 4' thio-bis (6-tert-butyl meta cresol) in sorbitan monolaurate of theoretical molecular weight 1226 and anisole (methyl phenyl ether) in a fixed ratio by weight forming a mixture;
    calendering a second polyethylene oxide polymer of molecular weight $9 \times 10^5$ into a film of thickness 1.7 mils;
    distributing said mixture over the film of said second polyethylene oxide polymer in a mold cell;
    heating said mold cell to a temperature of 230° F under pressure of 500 psi; and
    cooling said mold cell under pressure to form the improved molded coating.

* * * * *